(12) United States Patent
Flanagan

(10) Patent No.: US 11,439,140 B2
(45) Date of Patent: Sep. 13, 2022

(54) ANIMAL DEBILITATING ENCLOSURE

(71) Applicant: Edward Jay Flanagan, Oakley, MI (US)

(72) Inventor: Edward Jay Flanagan, Oakley, MI (US)

(73) Assignee: SLICE A LIFE ARCHERY L.L.C., Oakley, MI (US)

( * ) Notice: Subject to any disclaimer, the term of this patent is extended or adjusted under 35 U.S.C. 154(b) by 103 days.

(21) Appl. No.: 16/925,861

(22) Filed: Jul. 10, 2020

(65) Prior Publication Data

US 2022/0007632 A1    Jan. 13, 2022

(51) Int. Cl.
*A01M 23/22*    (2006.01)
*A01M 23/00*    (2006.01)

(52) U.S. Cl.
CPC ............ *A01M 23/22* (2013.01); *A01M 23/00* (2013.01)

(58) Field of Classification Search
CPC .............................. A01M 23/00; A01M 23/22
USPC .............................................................. 43/62
See application file for complete search history.

(56) References Cited

U.S. PATENT DOCUMENTS

| | | | | |
|---|---|---|---|---|
| 79,577 A | * | 7/1868 | Kohler ................. | A01M 23/22 43/62 |
| 104,570 A | * | 6/1870 | Fox ....................... | A01M 23/22 43/62 |
| 106,858 A | * | 8/1870 | Newton ................ | A01M 23/22 43/62 |
| 215,308 A | * | 5/1879 | Witt ...................... | A01M 23/22 43/62 |
| 778,675 A | * | 12/1904 | Kerns ................... | A01M 23/22 43/62 |
| 821,913 A | * | 5/1906 | Wilson ................. | 43/110 |
| 1,088,477 A | * | 2/1914 | De St. Legier ....... | A01M 23/22 43/62 |
| 1,421,610 A | * | 7/1922 | Svehla ................. | A01M 23/00 43/88 |
| 1,441,118 A | * | 1/1923 | Sacks ................... | A01M 23/00 43/61 |
| 1,470,854 A | * | 10/1923 | Lively .................. | A01M 23/00 43/79 |
| 1,584,677 A | * | 5/1926 | Wallis .................. | A01M 23/30 43/78 |
| 1,726,167 A | * | 8/1929 | Swint ................... | A01M 23/00 43/74 |
| 1,727,325 A | * | 9/1929 | Bilinski ............... | A01M 23/00 43/79 |
| 1,782,661 A | * | 11/1930 | Midgett ............... | A01M 23/00 43/66 |

(Continued)

*Primary Examiner* — Timothy D Collins
*Assistant Examiner* — Nicholas Leo Seneczko
(74) *Attorney, Agent, or Firm* — Panagos Kennedy PLLC; Bill Panagos; Linda Kennedy

(57) ABSTRACT

An enclosure for debilitating an animal is disclosed herein. The enclosure can include a compressing plate, a plurality of structural supports, a support surface, and a sensory deprivation shield. The compressing plate can be configured to receive a force causing the compressing plate to move in the direction of the force. The compressing plate can then debilitate the target animal within an internal region between the compressing plate and the support surface. The enclosure provides convenience and control for the hunter over the target animal, while avoiding the use of weapons or traps.

20 Claims, 5 Drawing Sheets

(56) References Cited

U.S. PATENT DOCUMENTS

| | | | | | |
|---|---|---|---|---|---|
| 1,815,541 | A * | 7/1931 | Bohannon | A01M 23/00 43/61 |
| 1,951,296 | A * | 3/1934 | Kleffman | A01M 23/00 43/85 |
| 1,963,435 | A * | 6/1934 | Burnley | A01M 23/00 43/61 |
| 1,972,641 | A * | 9/1934 | Barrett | A01M 23/00 43/80 |
| 2,123,789 | A * | 7/1938 | Miller | A01M 23/00 43/60 |
| 2,151,046 | A * | 3/1939 | Porciuncula | A01M 23/00 43/60 |
| 2,188,652 | A * | 1/1940 | Cress | A01M 23/00 43/61 |
| 2,252,812 | A * | 8/1941 | McAnlis | A01M 23/00 43/65 |
| 2,387,328 | A * | 10/1945 | Horowitz | A01M 23/20 43/67 |
| 2,680,922 | A * | 6/1954 | Welfl | A01M 23/00 43/1 |
| 3,008,261 | A * | 11/1961 | Long | A01M 23/22 43/62 |
| 4,127,958 | A * | 12/1978 | Peters | A01M 23/20 43/81 |
| 4,930,251 | A * | 6/1990 | Crisanti | A01M 1/02 43/107 |
| 5,024,021 | A * | 6/1991 | Wang | A01M 23/22 43/62 |
| 5,109,626 | A * | 5/1992 | Ha | A01M 23/22 43/78 |
| 10,143,192 | B2 * | 12/2018 | Brown | G01V 8/10 |
| 10,973,222 | B1 * | 4/2021 | Pankey | A01M 23/22 |
| 2005/0166441 | A1 | 8/2005 | Mattox | F41H 13/0006 43/1 |
| 2009/0151222 | A1 * | 6/2009 | Bruno | A01M 23/30 43/67 |
| 2010/0154287 | A1 * | 6/2010 | Irons | A01M 23/22 43/62 |
| 2013/0327589 | A1 * | 12/2013 | Smith | G10G 5/00 181/290 |
| 2014/0026475 | A1 * | 1/2014 | Centeno | A01G 13/02 47/29.5 |
| 2015/0237846 | A1 * | 8/2015 | Miyawaki | A01M 99/00 43/60 |
| 2015/0296766 | A1 * | 10/2015 | Gaskamp | G06K 9/00362 43/61 |
| 2017/0035040 | A1 * | 2/2017 | Hobbs | H04N 5/2257 |
| 2017/0238524 | A1 * | 8/2017 | Brugh | A01K 37/00 |
| 2018/0014507 | A1 * | 1/2018 | Lorig | A01K 15/026 |
| 2018/0160674 | A1 * | 6/2018 | Elftmann, Jr. | A01M 27/00 |
| 2019/0364874 | A1 * | 12/2019 | Hufstedler | A01M 23/00 |
| 2020/0344980 | A1 * | 11/2020 | Houghton | A01K 97/02 |

* cited by examiner

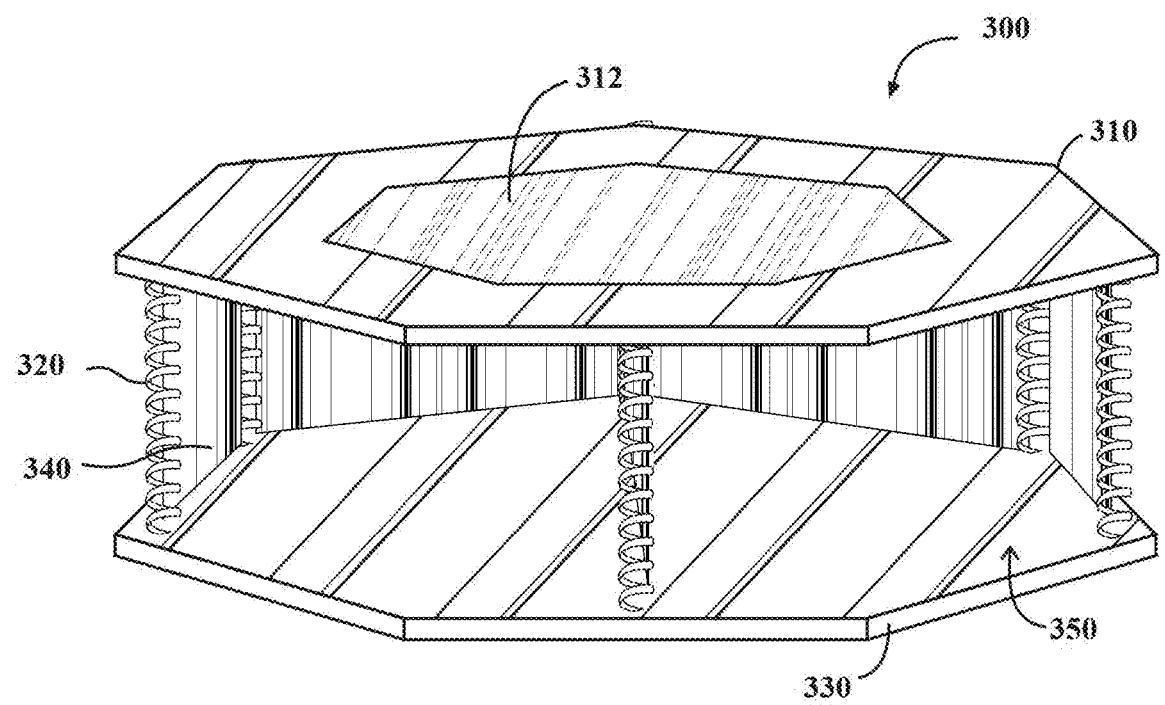
FIG. 3
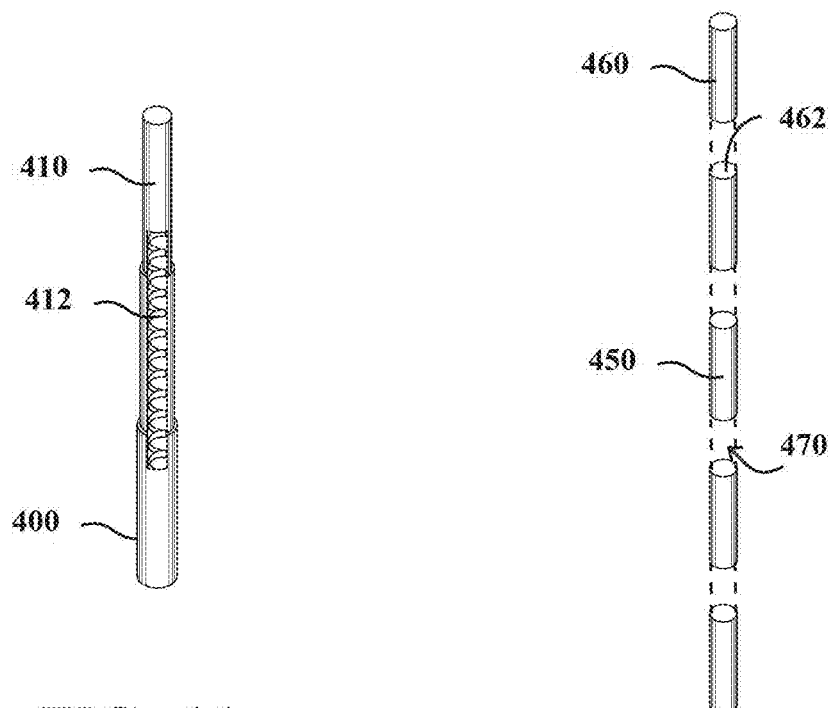
FIG. 4A
FIG. 4B

ANIMAL DEBILITATING ENCLOSURE

TECHNICAL FIELD

The subject matter described herein generally relates to animal shrouds used as sight and sound shielding and, more particularly, devices and systems for use in debilitating or otherwise incapacitating animals.

BACKGROUND

Hunters have been hunting and capturing various wild animals since ancient times, such as hunting for food or for the pelt or fur of the animal. However, wild animals are generally much more physically adept and responsive than the average hunter. This disparity in physical capability results in hunters relying on the availability of weapons or other tools for their hunting needs. However, there are some situations where the use of weapons or traps is less desirable. Weapons and traps can result in damage and injury to the flesh or hide of the animal, which lowers the value of the animal for its pelt or hide and possibly its food value as well.

In such situations, it can be desirable to render the animal unconscious or otherwise disabled. To achieve this goal, some have attempted debilitation through the use of tranquilizer guns and darts. However, the drugs used may affect the behavior of the animal, even after recovery, and/or some portion of the drugs may linger in the animal's system for some time after. Moreover, even where traps are applied to capture the animals, different animal prey can necessitate the use of different traps. This, of course, increases the cost and complexity of using traps. As well, the need for multiple traps increases weight on the hunter which reduces mobility in the field.

Therefore, there is a need in the art for devices which disable and minimize injury to the wild animal, without the use of weapons or traps.

SUMMARY

Animal debilitating enclosures, as well as related systems and methods for the same, are disclosed herein. In one implementation, an enclosure for debilitating an animal is disclosed. The enclosure can include a compressing plate comprising a rigid material. The compressing plate can include an outer surface, an inner surface positioned opposite the outer surface, and a plate edge bounding the inner surface and the outer surface of the compressing plate. The compressing plate can define an internal region between the inner surface and a support surface. The enclosure can further include a plurality of structural supports having a first end and a second end. The plurality of structural supports can interconnect with and support the compressing plate at the first end. The plurality of structural supports can further maintain an operational configuration of the compressing plate, where the operational configuration of the compressing plate is the position and orientation of the compressing plate before receiving the compressing force. The structural support can be configured to control the transition of the compressing plate from the operational configuration to a debilitating configuration upon receiving the compressing force. The enclosure can further include a sensory deprivation shield in connection with the compressing plate and forming a boundary between the internal region and an external environment. The sensory deprivation shield can include a flexible material. The sensory deprivation shield can be positioned in connection with the internal region, where the sensory deprivation shield can distort the transmission of sound and light to the internal region.

In further embodiments, an enclosure for debilitating an animal is disclosed. The enclosure can include a compressing plate configured to receive a compressing force. The enclosure can further include a plurality of structural supports connected to the compressing plate and the support surface. The plurality of structural supports can be configured to support the compressing plate a first distance from the support surface. The enclosure can further include a support surface configured to connect with the plurality of structural supports and receive a target animal. The plurality of structural supports can be operatively connected to create and maintain an internal region between the compressing plate and the support surface. The enclosure can further include a sensory deprivation shield bounding at least a portion of the internal region from an external environment. The sensory deprivation shield can be configured to distort sensory information received by the target animal from the external environment. The internal region can be defined by the shape and dimensions of the compressing plate and the distance between the compressing plate and the support surface. The plurality of structural supports can be configured to control the movement of the compressing plate in response to a compressing force.

In further embodiments, an enclosure for debilitating an animal is disclosed. The enclosure can include a compressing plate comprising a plurality of plate subunits. The plate subunits can each include a rigid material. The plate subunits can further be interconnected using a plurality of fastening elements. The compressing plate can include an outer surface for receiving a compressing force. The compressing plate can further include an inner surface positioned opposite the outer surface. The compressing plate can further include a plate edge bounding the inner surface and the outer surface of the compressing plate, the compressing plate defining an internal region between the inner surface and a support surface. The enclosure can further include a plurality of structural supports interconnecting with and supporting the compressing plate. The plurality of structural supports can maintain an operational configuration of the compressing plate, the operational configuration of the compressing plate being the position and orientation of the compressing plate before receiving the compressing force. The structural support can be configured to control the transition of the compressing plate from the operational configuration to a debilitating configuration upon receiving the compressing force. The enclosure can further include a sensory deprivation shield in connection with the compressing plate. The sensory deprivation shield can form a boundary between the internal region and the environment.

In further embodiments, an enclosure for debilitating an animal is disclosed. The enclosure can include a supporting surface comprising a rigid material. The supporting surface can have an outer surface and an inner surface positioned opposite the outer surface. The enclosure can further include a sensory deprivation shield. The sensory deprivation shield can be connection with the inner surface of the supporting surface. The sensory deprivation shield can define an internal region between the sensory deprivation shield and the inner surface. The sensory deprivation shield can include a flexible material. The sensory deprivation shield can distort the transmission of sound and light to the internal region. The enclosure can further include a plurality of structural supports. The plurality of structural supports can support the sensory deprivation shield. The plurality of structural supports can have a first end and a second end, the first end being in connection with the supporting surface. The plurality of structural supports can interconnect with and support the sensory deprivation shield as separated from the inner surface of the supporting surface. The plurality of structural supports can maintain an operational configuration of the sensory deprivation shield, where the operational configuration of the sensory deprivation shield is the position and orientation of the sensory deprivation shield before receiving the compressing force. The structural supports can be configured to control the transition of the sensory deprivation shield from the operational configuration to a debilitating configuration upon receiving the compressing force.

The sensory deprivation shield can include a flexible material, such as a sensory deprivation shield being composed partially of a flexible material or entirely of a flexible material. Further, the sensory deprivation shield can be positioned in connection with the internal region to distort the transmission of sound and light to the internal region.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only some implementations of this disclosure and are therefore not to be considered limiting of its scope. The disclosure may admit to other equally effective implementations.

FIG. 3 is an isometric view of an alternate implementation of an animal debilitating enclosures, according to one or more implementations.

FIGS. 4A and 4B are isometric views of structural supports which can be incorporated into an animal debilitating enclosure, according to one or more implementations.

To facilitate understanding, identical reference numerals have been used, wherever possible, to designate identical elements that are common to the figures. Additionally, elements of one implementation may be advantageously adapted for utilization in other implementations described herein.

DETAILED DESCRIPTION

The implementations disclosed herein generally relate to animal debilitating enclosures and methods of making and using the same. The animal debilitating enclosure is a device and system for aerial ambush of game animals. A game animals, also referred to as a target animal, is any animal which can be captured or killed for the hunter's consumption or use. Without intending to be bound by theory, it is generally understood that game animals can have a reaction capability which is considerably faster than the hunter can respond. As such, many forms of unaided hunter action can be rendered useless by the natural capabilities of the target animal.

To address this comparative deficiency, the animal debilitating enclosure includes one or more elements to block, obscure, or otherwise affect one or more senses of the target animal, such as sight, hearing, smell, or others. By the animal debilitating enclosure affecting the animal's senses, the animal's reaction capability is reduced. The hunter can then apply a compressing force to the animal debilitating enclosure. The compressing force is a force applied to the animal debilitating enclosure which, in conjunction with the enclosure, debilitates the target animal within or by otherwise applying the animal debilitating enclosure. The compressing force is transferred through the animal debilitating enclosure to the target animal, which debilitates the animal. Debilitate, as used herein, relates to the target animal being unable to avoid or respond to the hunter. As such, the animal is debilitated when disoriented, rendered unconscious, rendered non-ambulatory, killed, or any other form of inability to respond to stimuli. Thus, the animal debilitating disclosure can allow for kill or capture of the target animal, without the use of traps or weapons.

Further, the animal debilitating enclosure enables a hunting strategy which can be applied with or without the human body weight providing the compressing force. In some examples, the animal debilitating enclosure can function with the application of force from a variety of sources, such as a hand, foot, club, hammer, or the like, as the source of compressing force for the enclosure. In further examples, the hunter jumps from an aerial platform debilitating the target with the gravitational force of the human body weight as the compressing force. The implementations disclosed herein are more clearly described with reference to the figures below.

Figure 1A:
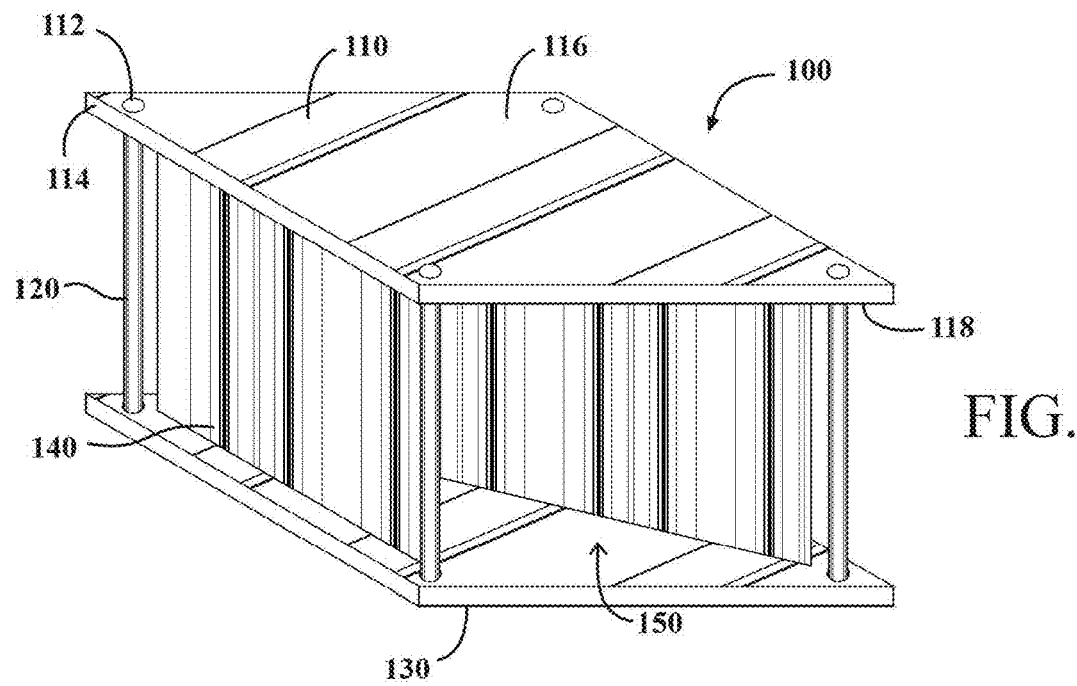
FIGS. 1A and 1B are isometric views of an animal debilitating enclosure, according to one or more implementations.
Figure 1B:
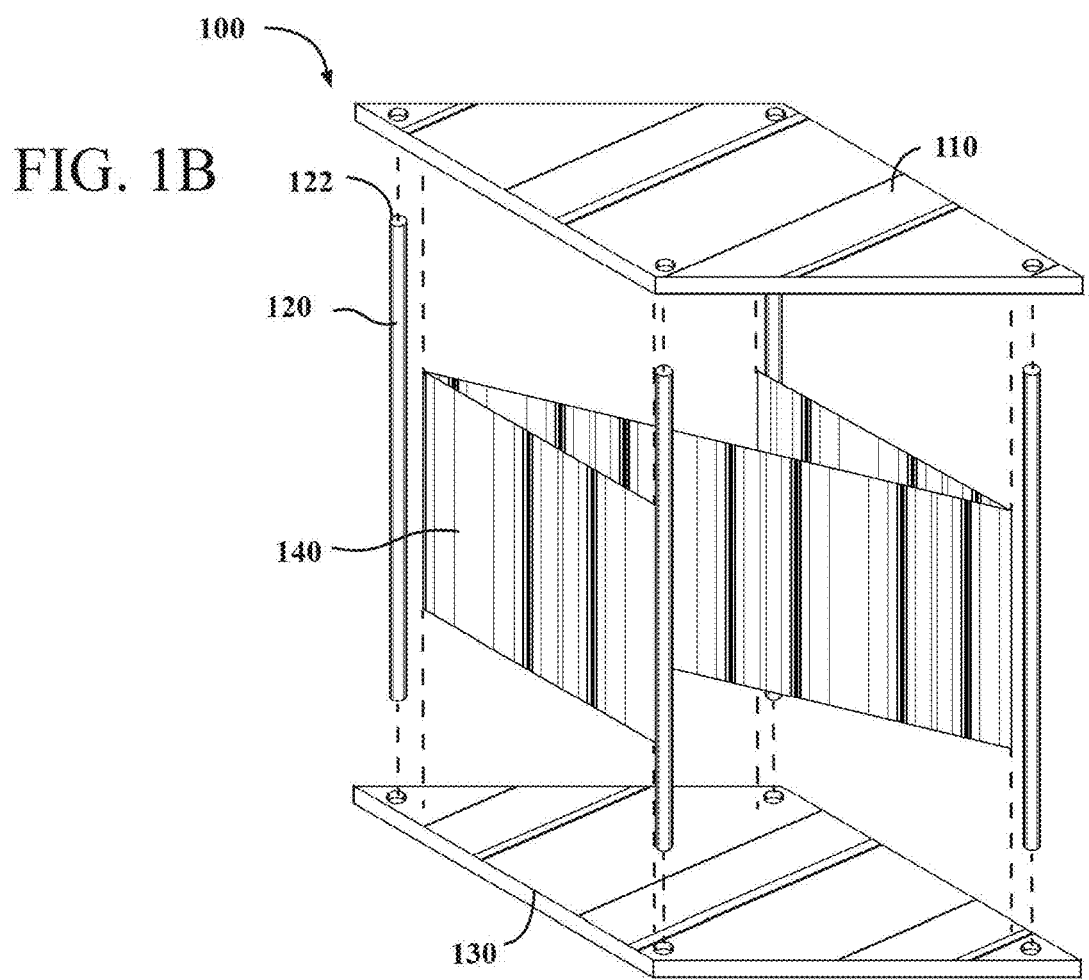

FIG. 1A is an isometric view of an animal debilitating enclosure 100, according to one or more implementations. FIG. 1B is an exploded view of the animal debilitating enclosure 100, depicted in FIG. 1A. The animal debilitating disclosure 100 is a device, system, or combination thereof which creates a confined alternative environment for the target animal. The animal debilitating enclosure 100 can employ sensory components to distort, mimic, or obfuscate the natural surround environment. To limit effective response to the change, the animal debilitating enclosure 100 can also affect the senses of the target animal without alerting the target animal of the environmental change. Further, the animal debilitating enclosure can reversibly deform when provided with a compressing force, such that the environment is maintained without alerting the target animal to the hunter's presence until after the target animal is debilitated. As such, the animal debilitating enclosure 100 allows a hunter to stalk, disable, or even kill target animal without the use of weapons or traps.

The animal debilitating enclosure 100 can include a plurality of elements to create the environmental control described above. In some implementations, the animal debilitating enclosure 100 includes a compressing plate 110, a support surface 120, a structural support 130, and a sensory deprivation shield 140. The support surface 120 can hold the compressing plate 110 in an operational configuration. The animal debilitating enclosure can transition configurations to allow the hunter to debilitate the animal. When a compressing force is applied, the compressing plate 110 moves toward the support surface 120, causing the animal debilitating enclosure 100 to transition from the operational configuration to the debilitating configuration. The transition to the debilitating configuration can then be applied to the target animal through the animal debilitating enclosure 100, which allows the hunter to debilitate the target animal. Terms such as above, below, or other terms which indicate directionality are used for descriptive purposes only and are not limiting of possible implementations.

The compressing plate 110 is a substantially flat surface which receives the compressing force, where flatness of a surface is defined by the level of variance between two parallel planes. The compressing plate 110 can include one or more connection ports 112, a plate edge 114, an outer surface 116, and an inner surface 118. In some implementations, the outer surface 116 and the inner surface 118 can be substantially parallel. As used herein, the term "substantially" includes exactly the term it modifies and slight variations therefrom. Thus, the term "substantially flat" means completely flat and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

The compressing plate 110 can include or be composed of any material capable of providing some level of rigidity and capable of functioning as a component of one or more of the implementations of the animal debilitating enclosure 100, as described herein. In some implementations, the compressing plate 110 can be composed of a rigid, semi-rigid material, or combinations thereof. The materials can include metals, polymers, ceramics, natural materials (e.g., wood, stone, etc.), composites, and/or others. The materials can further include combinations of the above materials. The combinations of the above materials can be configured to achieve a specific set of purposes (e.g., ferromagnetism and a rubberized/high friction surface). The combinations of the above materials can include layered combinations, such as vertically layered combinations, horizontally layer combinations, layered combinations with varying angles of the layers, and/or combinations thereof. The combinations can further include interspersed combinations, such as fibers of a first material interspersed through second material (e.g., fiberglass), doped materials, alloys, or others.

The compressing plate 110 can be configured with a number of material characteristics, such as in relation to user choice and/or environment. In one or more implementations, the material characteristics of the compressing plate 110 generally and/or individual elements thereof can include resistance to abrasion, resistance to specific chemicals/chemistries, specific friction levels, electrical and/or magnetic conductivity, or others as desired. In one or more implementations, the interlocking panel 200 can generally be composed of and/or include any combination of one or more materials.

The compressing plate 110 can be configured to withstand a compressive force without deformation or reduction of structural integrity. The compressing force can be a relatively large force, as compared to the physical dimensions and characteristics of the compressing plate 110. In some implementations, the compressive force can be equivalent to the force created by an average person falling from a tree or deer stand, such as approximately 2000 Joules of force. In some implementations, the compressing plate 110 can include design elements which allow the compressing plate 110 to prevent deformation, reduction of structural integrity, or both. Design elements are formations or structures designed to redirect or displace forces applied to the compressive plate 110 or to the specific region. In some examples, design elements can include the insertion of one or more regions of flexibility, distribution of weight in specific regions to control the uniformity of movement upon impact, or others. In further implementations, the compressing plate 110 contains one or more flexible regions positioned at regions of contact with the compressing force to distribute force throughout the compressing plate 110. In the alternative or in conjunction with the above described configurations and/or design elements, the compressing plate 110 can include materials which are inherently capable of reducing or eliminating the deformation or structural integrity problems described above. One skilled in the art will understand the number and variety of possible combinations of the elements described above, without further explicit recitation herein.

The connection ports 112 can be configured to receive the structural support 120. In some examples, the one or more connection ports 112 can be formed partially or completely through the compressing plate 110. As shown here, the one or more connection ports 112 form a complete passage through the compressing plate 110. The one or more connection ports 112 can be configured to receive the one or more of the structural supports 120.

The one or more connection ports 112 can be formed in a variety of shapes, including all primary shapes and/or combinations thereof. Further, the one or more connection ports 112 can have different shapes as compared to one another, including the formation of pairs or other groupings within the one or more connection ports 112. The pairs or other groupings of the one or more connection ports 112 can be based on positioning, orientation, general shape and/or combinations of shape, variations in width/height/depth, angle of penetration, other facets which can be used to establish a general grouping of the one or more connection ports 112, or combinations thereof. In some implementations, the one or more connection ports 112 can be formed integrally in the compressing plate 110, such as a hole, which can be drilled or bored into the compressing plate 110. In further implementations, the one or more connection ports 112 can be an element embedded in the compressing plate 110, such as a metal shell or bushing configured to receive the one or more structural supports.

The plate edge 114 is a region bounding the outer surface 116 and the inner surface 118 of the compressing plate 110, where the outer surface 116 is the externally exposed surface of compressing plate 110 and the inner surface 118 is the surface of the compressing plate 110 positioned opposite the outer surface 116. The plate edge 114 can perform any desired angle with reference to the outer surface 116 in the inner surface 118, depicted here as perpendicular or 90°. The plate edge 114, the outer surface 116, and the inner surface 118 can have any of a variety of desired surface types or textures, to achieve the desired result as described herein. In some implementations, the plate edge 114, the outer surface 116, and the inner surface 118 can have a substantially flat surface. In further implementations, the plate edge 114, the outer surface 116, and the inner surface 118 can have one or more materials incorporated into said surface, such as a rubberized coating.

The one or more structural supports 120 are elements which support the compressing plate 110, as part of the animal debilitating enclosure 100. The one or more structural supports 120 can be reversibly deformable elements which connect to and support the compressing plate 110. The one or more structural supports 120 can act in conjunction with the compressing plate 110 for transition between the operational configuration and the debilitating configuration. Reversible deformation, as used herein, is the ability of an object to bend, flex, pivot, twist, or otherwise change position or orientation from a first state to a second state and then controllably and/or automatically returning to the first state.

In some implementations, the structural supports 120 are reversibly flexible or bendable. Thus, upon the compressing plate 110 receiving the compressing force, the structural supports 100 can bend or flex in one or more directions such that the compressing plate 110 can move in a direction corresponding to the direction of the compressing force. In some examples, the structural supports 120 can include rigid elements, flexible elements, or combinations thereof. Flexible elements which may be incorporated into the structural supports 120 can include hinges, flexible materials (e.g., rubber, elastomers, springs or coils, spring steel, or others), cables, or other materials designs or combinations thereof which allow movement between two or more connected rigid elements.

In further implementations, the structural supports 120 employ a sliding design to achieve reversibly deformability. Here, the compressing plate 110 can slide along the structural supports 120, and a flexible element returns the compressing plate 110 to the operational configuration. In some examples, the structural supports 120 can include a rod or pipe, upon which the one or more connection ports 112 of the compressing plate 110 can slide, and a spring, such that the one or more structural supports 120 can return to the first state. The flexible element of the structural supports 120 can act in conjunction with the substantially rigid element to self-heal the animal debilitating enclosure 100. Self-healing, as used herein, refers to the ability of an object to return to an original state after deformation without direct manipulation by a user. As the one or more structural supports 120 return to the first state, the compressing plate 110 can also return to the operational configuration. The return of the compressing plate 110 to the operational configuration can occur simultaneously with or sequential to the one or more structural supports 120 returning to the first state.

In one or more implementations, the one or more connection ports 112 can be configured to create a flat surface in connection with an end region 122 of the one or more structural supports 120. As shown in FIGS. 1A and 1B, the connection ports 112 of the compressing plate 110 can receive the end portion 122 of the structural supports 120. In some implementations, the end portion 122 of the one or more structural supports 120 can be configured to securely interlock with and affix within the one or more connection ports 112. In some examples, the end portion 122 can include screw-like threads which can be received by corresponding threads within the one or more connection ports 112. In this example, once the end portion 122 is screwed into the one or more connection ports 112, the structural support 120 is affixed to the compressing plate 110 for further engagement with other components of the animal debilitating enclosure 100.

The animal debilitating enclosure 100 can further include a support surface 130. The support surface 130 is an opposing surface to the compressing plate 110. The support surface 130 can, in operation, form the lower surface of the animal debilitating enclosure 100. In some implementations, the support surface 130 is a natural environmental surface, such as the ground or the floor. As such, the support surface 130 can be transient to the animal debilitating enclosure 100. In further implementations, the support surface 130 can be a plate or other artificial surface configured to receive the target animal. The support surface 130 can include one or more elements to reduce or minimize efficient response from the target animal, such as a low friction surface In yet further implementations, the support surface 130 is substantially similar to one or more implementations or examples described with reference to the compressing plate 110. In one or more implementations, the support surface 130 can incorporate shapes, compositions, design features, configurations, or combinations thereof as described with reference to the compressing plate 110. Further, the support surface 130 can independently incorporate elements described with reference to the compressing plate 110, such that one or more implementations incorporated into the compressing plate 110 can be substantially similar to one or more implementations incorporated into the support surface 130.

The animal debilitating enclosure 100 can further include a sensory deprivation shield 140. The sensory deprivation shield 140 is a structure configured to or capable of reducing, distorting, minimizing, preventing, or otherwise interfering with one or more senses of the target animal. Without intending to be bound by theory, it is believed that the target animal has one or more senses (e.g., sight, smell, taste, hearing, and/or touch) which perform superior to that of humans. The sensory deprivation shield 140 can interfere with those senses, to minimize or prevent premature detection of the hunter. Thus, the sensory deprivation shield 140 can provide the hunter a strategic advantage over the target animal to facilitate debilitation.

The sensory deprivation shield 140 can incorporate materials and/or design elements to affect the senses of the target animal. In some implementations, the sensory deprivation shield 140 can include a material capable of diminishing, distorting, or otherwise affecting sensations received or detected by the target animal to inform the target animal about the environment, such as those commonly associated with sound, light, or smell. Materials which can be incorporated as part of the sensory deprivation shield 140 can include natural or synthetic fabrics (e.g., cotton, nylon, rayon), plastics, metals, metal alloys, natural or synthetic elastomers (e.g., rubber), fiber pulp products (e.g., paper), or others. The sensory deprivation shield 140 can further include camouflage elements. The camouflage elements are features or appearances which help the sensory deprivation shield 140 and/or the animal debilitating enclosure 100 blend into the external environment. Camouflage elements can include pixelated colors or patterns, or images of elements or objects within a natural environment (e.g., rocks or trees). In further implementations, the sensory deprivation shield 140 can include electronic elements to further affect the senses of the target animal favorably to the hunter, such as noise canceling devices, natural sound production, light absorption, or other elements to provide the hunter the desired sensory strategic advantage described herein.

Further, it is understood that shape, thickness, positioning, orientation, and other facets of the sensory deprivation shield 140 can be used to further affect the senses of the target animal. In some implementations, the sensory deprivation shield 140 is positioned at the plate edge 114 of the compressing plate 110. Here, the sensory deprivation shield 140 creates an artificial environment using the entire space of the internal region 150, where angles formed at the corners of the plate edge 114 act to reflect inbound sounds away from the animal and otherwise distort the position of objects within the outside environment. In some implementations, sound distortions created can be from the perspective of the target animal, such as by sound reflection from one or more surfaces of the sensory deprivation shield 140. In further embodiments, thickness of the sensory deprivation shield 140 in certain regions can be used to mimic the passage of light between leaves creating a "natural shadowing" within the artificial environment. In yet further embodiments, the density of materials within the sensory deprivation shield 140 can be altered at specific locations to further mimic light and sound patterns created by trees, rocks, or other objects presented as part of the illusion on the sensory deprivation shield 140.

The animal debilitating enclosure 100 thus provides numerous benefits to the hunter both with reference to controlling the result with the target animal and by rendering the use of weapons or traps unnecessary. By transferring the compressing force from the hunter through the animal debilitating enclosure 100, the hunter can more easily debilitate or kill the target animal. The force transferred to the target animal, as well as directionality of said force, can be controlled through components of the animal debilitating enclosure 100. Therefore, the animal debilitating enclosure 100 provides the hunter a strategic advantage while reducing the advantages of the target animal, thus better allowing the hunter to control the outcome of the hunt, while avoiding the use of weapons or traps.

Figure 2A:
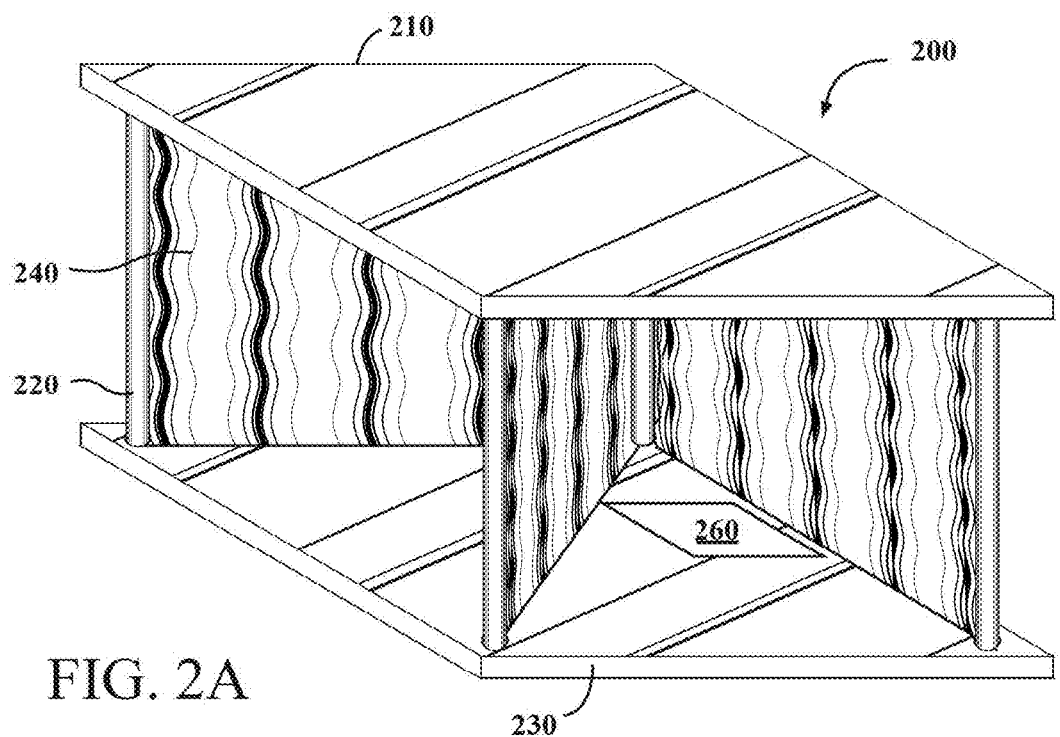
FIGS. 2A and 2B are isometric views of an animal debilitating enclosure transitioning between operational and debilitating configurations, according to one or more implementations.
Figure 2B:
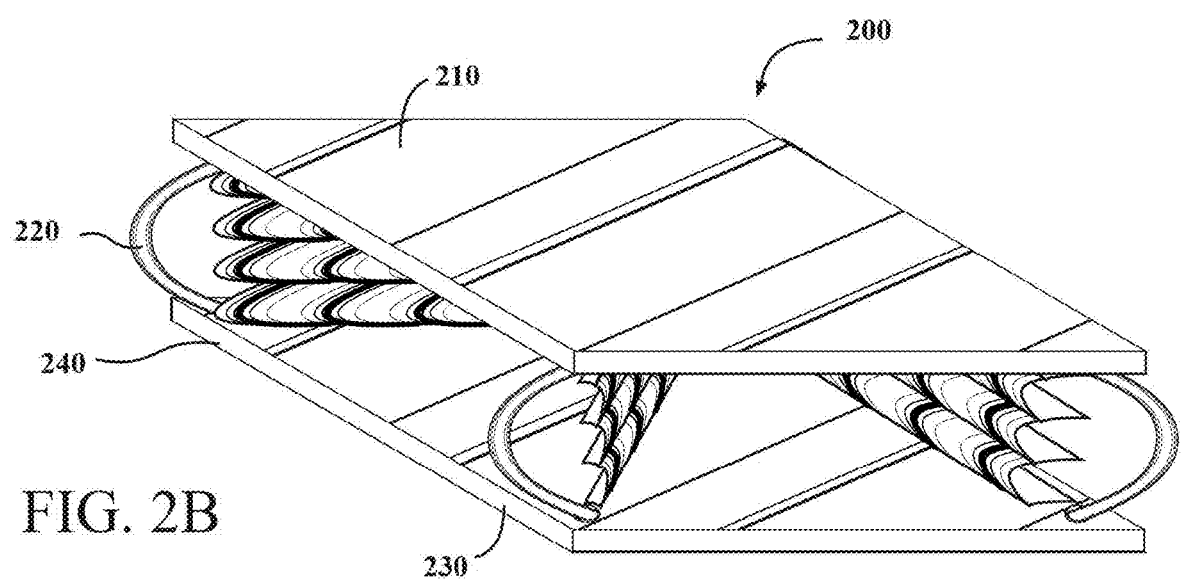

FIGS. 2A and 2B are isometric views of an animal debilitating enclosure 200 transitioning between operational and debilitating configurations, according to one or more implementations. The operational configuration of the animal debilitating enclosure 200 is depicted in FIG. 2A and the debilitating configuration is depicted in FIG. 2B, according to implementations described herein. In some implementations, the animal debilitating enclosure 200 can fluidly transition between the operational configuration and the debilitating configuration, as depicted in FIGS. 2A and 2B respectively.

The animal debilitating enclosure 200 can include a compressing plate 210, one or more structural supports 220, a support surface 230, and a sensory deprivation shield 240. The one or more structural supports 220 and the sensory deprivation shield 240 can each be flexible in one or more directions (e.g., length or width), such that the compressing plate 210 can fluidly move in the direction of the support surface 230 and/or the compressing force. The elements of the animal debilitating enclosure 200, including the compressing plate 210, the structural supports 220, the support surface 230, and/or a sensory deprivation shield 240, can be substantially similar to one or more examples or implementations described with reference to FIGS. 1A and 1B. The one or more examples and/or implementations described above with reference to FIGS. 1A and 1B, can be mixed or combined for any or all of the compressing plate 210, the structural supports 220, the support surface 230, and/or a sensory deprivation shield 240 incorporated as part of the animal debilitating enclosure 200.

The sensory deprivation shield 240 is depicted herein in an alternate configuration in connection with the structural supports 220, depicted here as four (4) structural supports 220. In this example, the sensory deprivation shield 240 includes three (3) portions, each of which extending outward from a central attachment point, where the central attachment point is one of the one or more structural supports 220. The three (3) portions of the sensory deprivation shield 240 extend from the central attachment point outward to each of the remaining three (3) structural supports 220. The sensory deprivation shield 240 thus further defines an internal region 250 with two (2) entry points for the target animal into said region.

In operation, the animal debilitating enclosure 200 begins in the operational configuration, an example of which depicted at FIG. 2A. The one or more structural supports 220 can maintain the dimensions of the internal region 250 between the compressing plate 210, the support surface 230, and the sensory deprivation shield 240 to receive or house the target animal. The target animal can then be lured, enticed, or passively allowed to enter into the internal region 250, such as through the use of food or sound.

Without intending to be bound by theory, it is generally understood that the target animal can be cautious or otherwise wary of the unfamiliar environment created by the animal debilitating enclosure 200. As such, the animal debilitating enclosure 200 can include one or more response mitigation features 260 to reduce the wariness of the target animal, disorient or confuse the target animal, or otherwise minimize the likelihood of appropriate response from the animal to avoid debilitation by the hunter. One or more response mitigation features 260, depicted here as a sound device, can include camouflage, sound devices to produce enticing or disorienting sounds, lighting or shadowing within or outside the internal region 250, other features capable of achieving the above described goal, or combinations thereof. The response mitigation features 260 described herein can be transient, such as being activated by light or movement within a certain region, or by manual activation (e.g., a switch or a button). In further implementations, the response mitigation features 260 can be active (e.g., lights or shadowing used to create the illusion of the swaying tree) or passive (e.g., illusions or camouflage painted or printed within the internal region 250). Though the response mitigation features 260 is depicted as being formed on or into the support surface 230, location or type of the response mitigation features 260 is not intended to be limiting.

Once the target animal has moved into the internal region 250 and achieved the desired state of comfortability and/or disorientation within the internal region 250, the animal debilitating enclosure 200 can be transitioned from the operational configuration to the debilitating configuration to debilitate the target animal. To transition the animal debilitating enclosure 200, the hunter can apply the compressing force to the compressing plate 210 of the animal debilitating enclosure 200. In some implementations, the hunter can apply the compressing force directly or indirectly. In some examples, the hunter applies a compressing force directly to the compressing plate 210 by jumping or falling from a desired elevation and landing on the compressing plate 210, such as from a tree or deer stand. In further examples, objects, such as rocks or clubs, may be used to deliver in the compressing force to the compressing plate 210. The compressing force from the weight of the object or the hunter is transferred through the compressing plate 210 to the structural supports 220.

One example of the animal debilitating enclosure 200 in the debilitating configuration is depicted in FIG. 2B, according to some implementations. The structural supports 220 then shift from the first state to the second state. In some implementations, the structural supports 220 can shift from the first state to the second state in a fluid motion, such as by allowing sliding of the compressing plate 210 along the length of the structural supports 220 or by flexing or bending along the length of the structural supports 220 in a fluid manner. In further implementations, the structural supports 220 can shift from the first state to the second state in an instantaneous manner, such as by separating a predesigned breaking points along the length of the structural supports 220 or by component members of the structural supports 220 sliding together in a telescoping fashion, examples of which are shown in FIGS. 4A and 4B. Either simultaneously with or subsequent to the shift from the first state to the second state, the compressing plate 210 can then moves from the operational configuration to the debilitating configuration with an internal surface 218 of compressing plate 210 being in closer proximity to the internal surface 238 of the support surface 230. The movement of the compressing plate 210 toward the support surface 230 applies a portion of the compressing force, referred to herein as the debilitating force, to the target animal.

Thus, the animal debilitating enclosure 200 reduces and mitigates the natural advantages of the target animal and allows a hunter better control of the results of the initial attack on the target animal. The animal debilitating enclosure 200 reduces the target animal's ability to respond by increasing convertibility, increasing disorientation, or combinations thereof. The hunter can then apply the compressing force to transition the animal debilitating enclosure 200 from the operational configuration to the debilitating configuration, and use this transition to debilitate the target animal. In this way, the animal debilitating enclosure 200 provides the hunter more success with unarmed hunting and more control over the results of an attack on the target animal.

FIG. 3 is an isometric view of an alternate implementation of an animal debilitating enclosure 300, according to one or more implementations. The animal debilitating enclosure 300 can include a compressing plate 310, one or more structural supports 320, a support surface 330, a sensory deprivation shield 340, and the internal portion 350. In some implementations, the compressing plate 310 and the support surface 330 are shown here having a generally heptagonal shape. The animal debilitating enclosure 300 is further depicted with one or more spring or coil-type structural supports 320. Unless expressly excluded, it is understood that the compressing plate 310, the one or more structural supports 320, the support surface 330, and the sensory deprivation shield 340 can incorporate any of the implementations or examples for equivalent elements described herein, such as those described with reference to FIGS. 1A and 1B above.

The compressing plate 310, as described herein, provides a rigid or semi-rigid surface to receive the compressing force. Here, the compressing plate 310 further includes a heptagonal shape. Variance in shape, such as by changing the number or the comparative size of walls, can allow for design changes which assist the hunter in debilitating the target animal. Specific examples of variance in shape can include providing a more open entry way into the internal portion 350, displacement of the one or more structural supports, changes in configuration of the sensory deprivation shield 340 to create a better sensory distortion through the shield 340, or others.

In some implementations, the compressing plate 310 can further include an impact plate 312. The impact plate 312 can be capable of or configured to distribute the compressing force throughout the compressing plate or other structures. As such, the impact plate 312 can provide a variety of benefits to the hunter, including protecting the structural integrity of the compressing plate 310 and assisting with distribution of force for proper function of the animal debilitating enclosure 300. The impact plate 312 can be connected with, connected to, or formed into the compressing plate 310. Further, the impact plate 312 can include one or more of a variety of materials capable of affecting force delivery to the compressing plate 310, including elastomers, metals, natural materials, or others.

In some implementations, the structural supports 320 are spring or coil designs. The spring or coil design allows for quick compression of the compressing plate 310 with quick return and self-healing of the animal debilitating enclosure 300 to the operational configuration. In this implementation, the hunter can rely on the animal debilitating enclosure 300 to move back to the operational configuration immediately after the compressing force is removed. This allows the hunter to focus on the behavior of the target animal, without need for lifting or setting the compressing plate 310.

The structural supports 320 are configured here, alongside the sensory deprivations shield 340 to subdivide the internal portion 350 two (2) chambers. In this example, a total of six (6) structural supports 320 are positioned at or between the corners of the compressing plate 310 and the support surface 330. The sensory deprivation shield 340 is configured to interconnect between the structural supports 320 to surround and split the internal portion 350. By controlling the size and number of chambers in the internal portion 350, the hunter can set the enclosure to receive different types of prey and/or better control movement of the target animal within the internal portion 350.

FIGS. 4A and 4B are isometric views of structural supports, according to further implementations. FIG. 4A depicts a telescoping structural support 400, according to some implementations. The telescoping structural support can provide a variety of benefits, including buffering or enhancing the debilitating force delivered to the animal and facilitating self-healing of an animal debilitating enclosure, as described with reference to FIGS. 1A-3. The structural supports described with reference to FIGS. 4A and 4B can be incorporated into or substituted for the structural supports 120, 220, or 320, described with reference to FIGS. 1A-3. Unless stated to the contrary, the structural supports 400 and 450 are substantially similar to the structural supports 120, 220, or 320, described with reference to FIGS. 1A-3.

The telescoping structural support 400 can include a plurality of support segments 410, shown here as three (3) support segments 410. The support segments 410 can be of a variety of shapes and sizes, such that one or more support segments 410 have a smaller width or diameter than others. In this way, the smaller support segments 410 can slide or collapse into the larger ones, this reducing the combined length of the segments in sequence. In this example, the three (3) support segments 410 are progressively smaller in diameter, such that each of the support segments 410 slides into the preceding one. In operation, the support segments 410 can be held in place by friction, through the use of springs, such as a spring 412, latches, or others. When the compressing force is received by the structural support 400, the support segments 410 can slide together decreasing the overall distance between the compressing plate and the support surface.

By increasing or reducing the debilitating force at the structural supports 400, the animal debilitating enclosure can be configured to modify the amount or the direction of the debilitating force delivered to the internal region and/or the target animal. In some implementations, the structural support 400 can include one or more enhancing elements 412 to decrease or increase the debilitating force delivered to the internal region and/or the target animal. The one or more enhancing elements 412 can include any device or combination of devices which can be employed to increase or reduce the debilitating force as transferred to the internal region. Examples of enhancing elements 412 can include springs, electroactive polymers, hydraulic devices, electrostatic devices (e.g., an electrostatic actuator), ferromagnetic or ferromagnetic materials, responsive mechanical devices (e.g., a fly wheel), or others capable of buffering, reducing, or increasing the force delivered to the internal region. By modifying the amount of compressing force which is transferred as debilitating force to the internal region and/or the target animal, the hunter can better control the result of the attack. The one or more enhancing elements 412, depicted here as a spring, can be configured to increase or decrease the debilitating force delivered to the internal region and, subsequently, the target animal. The hunter can use the control provided by the enhancing elements 412 to achieve a desired result to the target animal, such as to minimize or maximize kill efficiency, disable the target animal (e.g., for capturing the target animal), or avoid specific types of injury to the body or the pelt during the kill or debilitation.

FIG. 4B is an isometric disassembled view of a structural support 450, according to some implementations. The structural support 450 can reversibly self-disassemble upon an input from the hunter, such as by receiving the compressing force. The structural support 450 can be configured to collapse under high load or stress. Damage to the structural support 450 is reduced or prevented by minimizing reliance on the structural integrity to the whole structural support. As such, the structural support 450 can provide increased resilience under more extreme circumstances.

The structural support 450 can be formed of a plurality of separate interconnectable segments, shown here as five (5) interconnectable segments 460. The interconnectable segments 460 can reversibly break or collapse, such as in response to the compressing force. The interconnectable segments 460 can then reconnect or reattach, such as through one or more magnetic connectors 462. In some examples, the structural supports 450 can separate into the plurality of interconnectable segments 460 upon the compressing plate receiving the compressing force. Though the structural support 450 is depicted here with five (5) interconnectable segments 460, the number of interconnectable segments 460 is not intended to be limiting.

The interconnectable segments 460 of the structural support 450 can interconnect and separate at the connection region 470. The interconnectable segments 460 can connect and disconnect by a variety of mechanisms, such as magnetics, mechanical contact (e.g., quick release clamps), adhesives, deformable/disposable inserts, or others. Further, the interconnectable segments 460 can be configured to connect directionally, such that the order or combination of interconnectable segments 460 is maintained between uses, or universally, such that any order or direction of connection between the interconnectable segments 460 is allowable.

Through the use of interconnectable segments 460, the structural support 450 can avoid breakage under great weights or forces. One or more structural supports as shown in the structural support 450 can be incorporated into one or more implementations of the animal debilitating enclosure. When in the operational configuration, the structural supports 450 can provide support to the compressing plate and, upon receiving the compressing force, the structural supports 450 can break into the interconnectable segments 460. By breaking into the interconnectable segments 460, the force delivered by the compressing force can be redirected into the shorter interconnectable segments 460, rather than affecting the entire structural support 450 as a single unit. In some situations, this can reduce damage or deformation to the structural support 450.

Figure 5A:
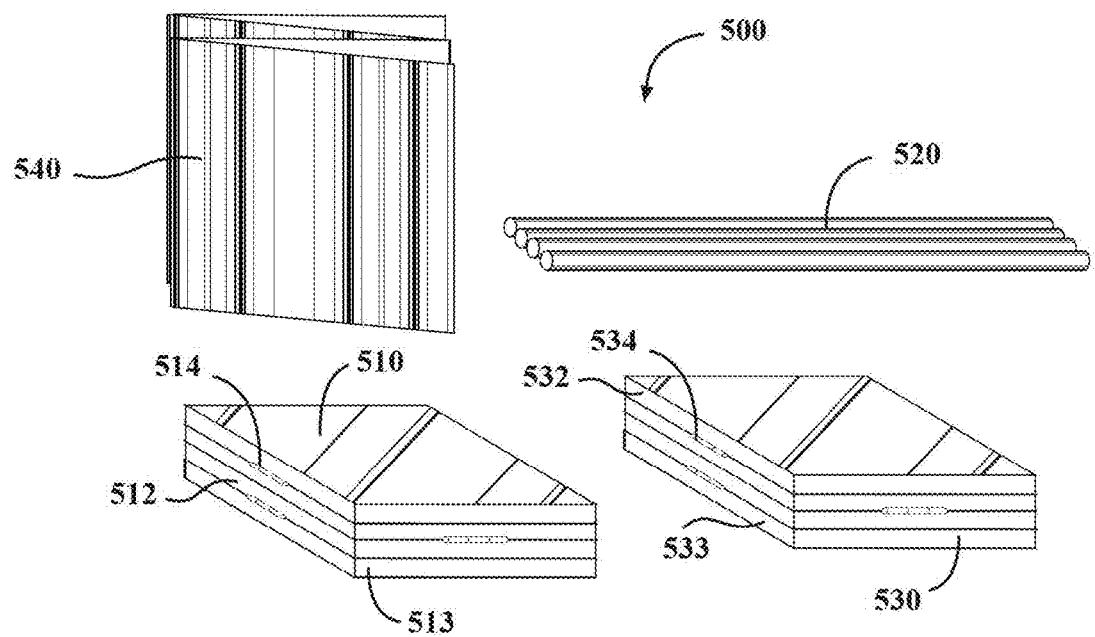
FIGS. 5A and 5B are isometric views of an animal debilitating enclosure as part of a kit or a storable system, according to one or more implementations.
Figure 5B:
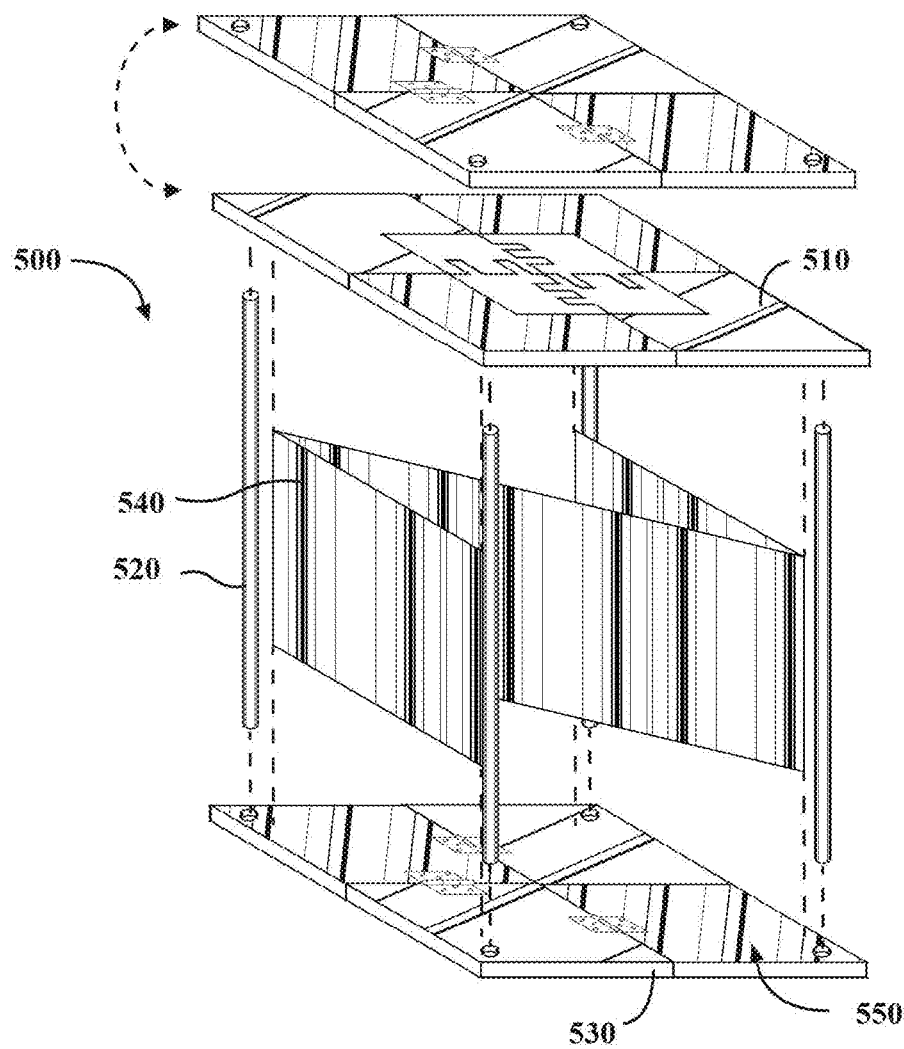

FIGS. 5A and 5B are isometric views of a kit or storage design for an animal debilitating enclosure 500, according to one or more implementations. In some implementations, the animal debilitating enclosure 500 can be reversibly assembled from one or more individual pieces for convenience, portability, and/or storage. In further implementations, the animal debilitating enclosure 500 can be permanently assembled from the kit, providing a permanent version of the animal debilitating enclosure 500 while providing convenience and space saving until the hunter is ready for the enclosure. Thus, the kit or storage form of the animal debilitating enclosure 500 provides for easy shipping, storage, and portability, allowing the hunter to have the enclosure available while reducing bulk.

FIG. 5A depicts the kit or storage design of the animal debilitating enclosure 500 in a disassembled form, according to some implementations. The animal debilitating enclosure 500 can include a compressing plate 510, one or more structural supports 520, a support surface 530, and a sensory deprivation shield 540. Unless expressly excluded, it is understood that the compressing plate 510, the one or more structural supports 520, the support surface 530, and the sensory deprivation shield 540 can incorporate any of the implementations or examples for equivalent elements described herein, such as those described with reference to FIGS. 1A and 1B above.

In some examples, the compressing plate 510 can be composed of one or more plate subunits 512, shown here as four (4) plate subunits 514. Each of the plate subunits 512 can have any shape or composition described above with reference to the compressing plate 110, described with reference to FIGS. 1A and 1B, including combinations thereof. The plate subunits 512 can include side walls 513 which can interface to form a continuous surface of the compressing plate 510. The side walls 513 can have one or more surface features such that the plate subunits 512 have the desired interface. Surface features of the side walls 513 can include physical characteristics which affect the interaction between the side walls 513, such as surface flatness, protrusions and indentations, respective surface angles, or others.

The plate subunits 512 can be interconnected to one another through one or more fastening elements 514. The fastening elements 514 can be any device which maintains connection between the plate subunits 512, such as bolts, hinges, adhesives, clamps, inserts (e.g., wooden dowels), or others which maintain a connection between two objects having features as described herein. In some examples, the fastening elements 514 can include a series of hinges. The fastening elements 514 can maintain a connection between the plate subunits 512 or other elements while allowing mobility, such as to allow for easy storage.

It is understood that, the implementations and examples described herein for the compressing plate 510 are equally applicable to the support surface 530. As such, the support surface 530 can include plate subunits 532, side walls 533, and fastening elements 534, each of said elements being substantially similar to implementations or examples described above with reference to the plate subunits 512, the side walls 513, and the fastening elements 514 for the compressing plate 510. The disassembled kit for the animal debilitating enclosure 500 can further structural supports 520 and the sensory deprivation shield 540, for connection in the assembled kit, shown with reference to FIG. 5B.

FIG. 5B is an exploded isometric view of the animal debilitating enclosure 500 during assembly, according to some implementations. In operation, the plate subunits 512 of the compressing plate 500 are unfolded at each of the fastening elements 514 to create a flat surface. Optionally, the compressing plate 510 can further include impact plate subunits 516 forming an impact plate 518. As shown on the upper surface of the compressing plate 510, the impact plate subunits 516 can include interlocking teeth 517, which interact to interlock the impact plate 518 when the compressing plate 510 is completely unfolded. The interlocking teeth 517 can provide stability and assist with transference of the compressing force to the compressing plate 510.

Once unfolded, the compressing plate 510 can be rotated to place the fastener elements on the lower surface and allow connection of the compressing plate 510 to the structural supports 520. As well, the similar configuration of the support surface 530 can be exposed to connect with the structural supports 520, creating the internal region 550. The sensory deprivation shield 540 can then be affixed to the compressing plate 510 and/or the support surface 530, such as through the use of the fastening elements 514. In some examples, the sensory deprivation shield 540 is affixed to the compressing plate 510 and/or the support surface 530 using an adhesive or screws as the fastening elements 514.

Through kits or storable implementations, the animal debilitating enclosure 500 can provide both convenience and ease of use to the hunter. The animal debilitating enclosure 500 can be stored in an unassembled state, allowing the hunter to reduce bulk in the field. Further, the animal debilitating enclosure 500 can be easily stored and rebuilt in multiple locations, allowing for easy travel between sites using the same animal debilitating enclosure 500.

In further implementations, the animal debilitating enclosures described herein can include at least one of the plurality of structural supports being a telescoping structural support. The telescoping structural support can further include one or more enhancing elements, the enhancing elements modifying the amount or direction of the compressing force delivered to the internal region. In some implementations, the enhancing element can be a spring. The spring can provide an opposing force, such as to reduce the compressing force delivered to the internal region. In further implementations, the enhancing element can be configured to render the compressing force non-lethal, as delivered to the target animal. In yet further implementations, the animal debilitating enclosures described herein can include the sensory deprivation shield comprising a flexible transparent material, a rigid transparent material, a flexible translucent material, a rigid translucent material, or combinations thereof.

Figure 6:
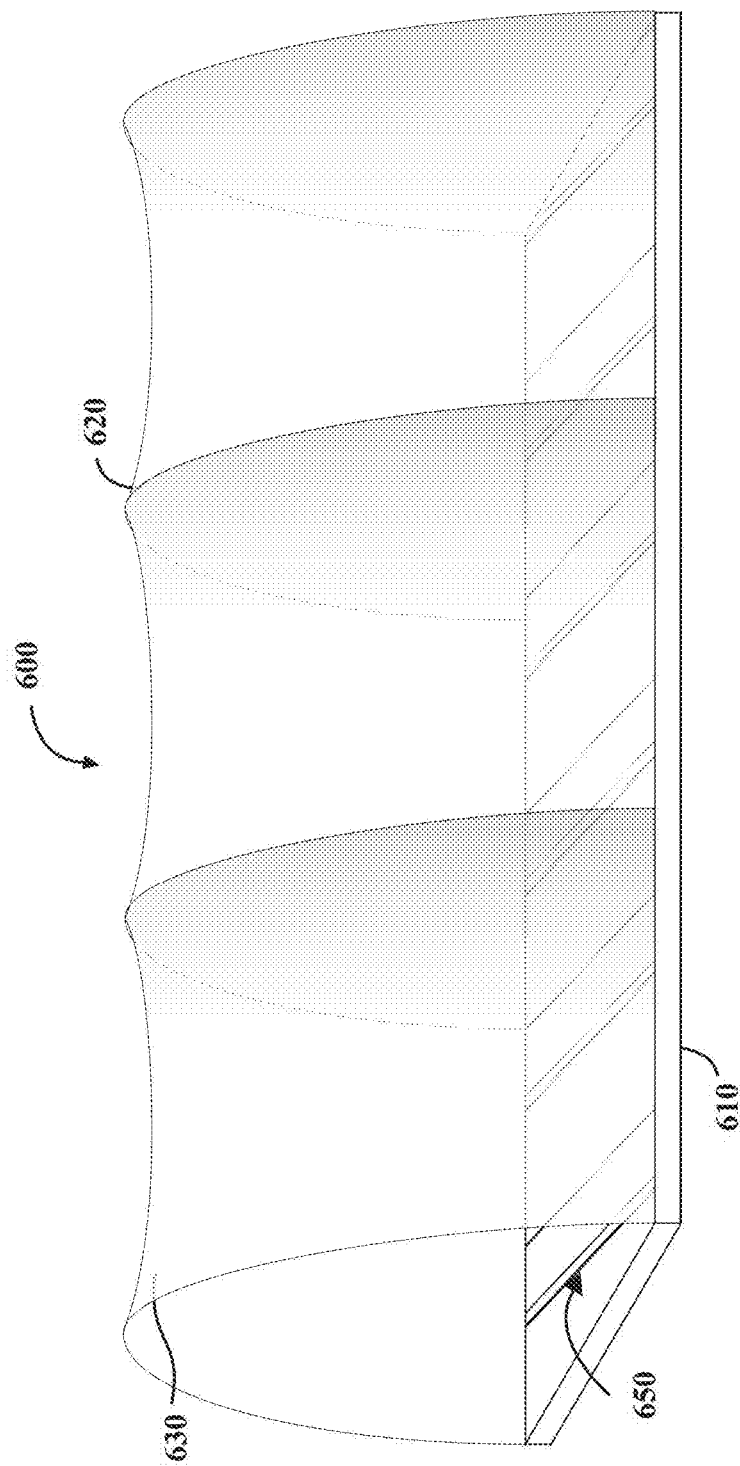
FIG. 6 is an isometric view of an alternate implementation of an animal debilitating enclosures, according to one or more implementations.

FIG. 6 is an isometric view of an alternate implementation of an animal debilitating enclosure 600, according to one or more implementations. The animal debilitating enclosure 600 can include a support surface 610, one or more structural supports 620, a sensory deprivation shield 630, and the internal portion 650. The animal debilitating enclosure 600 allows for a target animal to pass through the internal portion 650, with limited visibility to the outside environment. However, the target animal remains visible to the hunter while within the internal portion 650. In some implementations, the sensory deprivation shield 630 receives the compressing force, thus disabling the animal within the enclosure 600. Unless expressly excluded, it is understood that the support surface 610, the one or more structural supports 620, and the sensory deprivation shield 630 can incorporate any of the implementations or examples for equivalent elements described herein, such as those described with reference to FIGS. 1A and 1B above.

The animal debilitating enclosure 600 employs the support surface 610 to receive the target animal and maintain the shape and position of the sensory deprivation shield 630. The support surface 610 can incorporate implementations or examples described with reference to the compressing plate 110, the support surface 130, or combinations thereof, described with reference to FIGS. 1A and 1B. In some implementations, the support surface 110 is positioned substantially flat to receive the target animal. The support surface 610 can be of a size, shape, and thickness to provide stability and rigidity as desired for the operation of the animal debilitating enclosure 610.

The structural supports 620 can provide support to the sensory deprivation shield, with respect to the support surface 610. In some implementations, the structural supports 620 are connected to the support surface 610 at one or more locations, such as each of the structural supports 620 being connected at two locations on the support surface 610. The position, location, and type of the one or more structural supports 620 can provide control over the overall shape of the sensory deprivation shield 630. In some implementations, the structural supports 610 are configured to create an arch-like shape within the sensory deprivation shield 630. Further shapes created from the sensory deprivation shield 630 can include domes, cubes, or other primary three dimensional shapes, including combinations thereof. As well, the sensory deprivation shield 630 can be formed into layers of shapes, such as multiple tunnels or domes stacked or connected vertically or horizontally. One skilled in the art will understand the wide variety of shapes, sizes, and positionings in light of the examples and disclosures provided, without further specific recitation herein.

In operation, the target animal can move into the internal portion 650 of the animal debilitating enclosure 600. The sensory deprivation shield 630 can include a flexible transparent material, a rigid transparent material, a flexible translucent material, a rigid translucent material, or combinations thereof. As such, the target animal may have a limited view of the exterior environment through the sensory deprivation shield 630, such as a view limitation of 5 feet or less. Once the hunter is comfortable with the positioning of the target animal, the hunter can then apply a compressing force to the sensory deprivation shield 630, the structural supports 620, or combinations thereof. The compressing force then transitions the sensory deprivation shield 630 and the structural supports from the operational configuration to the debilitating configuration, which debilitates the target animal.

The animal debilitating enclosure 600 provides numerous advantages over weapons or traps. The animal debilitating enclosure 600 can reduce weight and bulk while offering the hunter a strategic advantage over the target animal. Thus, the animal debilitating enclosure 600 offers different configuration with many of the same benefits described with reference to alternate implementations of the animal debilitating enclosures disclosed herein.

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and devices according to various implementations. In this regard, each block in the flowcharts or block diagrams can represent a module, segment, or portion of code, which can include one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the implementation of the methods described herein and, which when loaded in a processing system, is able to carry out these methods.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one implementation or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure. While the foregoing is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A device for aerial ambush of an animal, comprising:
a hunter-actuated compressing plate comprising a rigid material, the compressing plate comprising:
an outer surface;
an inner surface positioned opposite the outer surface; and
a plate edge bounding the inner surface and the outer surface of the compressing plate, the compressing plate defining an internal region between the inner surface and a support surface;
a plurality of structural supports having a first end and a second end, the plurality of structural supports interconnecting with and supporting the compressing plate at the first end, the plurality of structural supports maintaining an operational configuration of the compressing plate, the operational configuration of the compressing plate being the position and orientation of the compressing plate before receiving a hunter applied compressing force, the structural support being configured to control the transition of the compressing plate from the operational configuration to a debilitating configuration upon receiving the compressing force; and
a sensory deprivation shield in connection with the compressing plate and forming a boundary between the internal region and an external environment, the sensory deprivation shield comprising a flexible material and positioned in connection with the internal region, the sensory deprivation shield distorting the transmission of sound and light to the internal region, the internal region having an opening permitting animal access between the internal region and the external environment in the absence of hunter actuation.

2. The device of claim 1, wherein the support surface is a plate, the plate being connected with the plurality of structural supports as a second end.

3. The device of claim 1, wherein at least one of the plurality of structural supports is a telescoping structural support.

4. The device of claim 3, wherein the telescoping structural support further includes one or more enhancing elements, the enhancing elements modifying the compressing force delivered to the internal region.

5. The device of claim 4, wherein the enhancing element is a spring, the spring providing an opposing force to reduce the compressing force delivered to the internal region, and wherein the enhancing element is configured to render the compressing force non-lethal, as delivered to the target animal.

6. The device of claim 1, wherein the sensory deprivation shield comprises a flexible transparent material, a rigid transparent material, a flexible translucent material, a rigid translucent material, or combinations thereof.

7. The device of claim 1, wherein the compressing plate further comprises an impact plate.

8. A device for aerial ambush of an animal, comprising:
a hunter-actuated compressing plate configured to receive a compressing force;
a plurality of structural supports connected to the compressing plate and the support surface, the plurality of structural supports being configured to support the compressing plate a first distance from the support surface;
a support surface configured to connect with the plurality of structural supports and receive a target animal, the plurality of structural supports being operatively connected to create and maintain an internal region between the compressing plate and the support surface; and
a sensory deprivation shield bounding at least a portion of the internal region from an external environment, the sensory deprivation shield being configured to distort sensory information received by the target animal from hunter movement, the internal region being defined by the shape and dimensions of the compressing plate and the distance between the compressing plate and the support surface, plurality of structural supports being configured to control the movement of the compressing plate in response to a compressing force, the internal region having an opening permitting animal access between the internal region and the external environment in the absence of hunter actuation.

9. The device of claim 8, wherein the support surface is further configured to resist deformation in response to the compressing force.

10. The device of claim 8, wherein at least one of the plurality of structural supports is configured to move or flex in response to the compressing force.

11. The device of claim 8, wherein at least one of the plurality of structural supports is further configured to modify the compressing force delivered to the internal region.

12. The device of claim 11, wherein the at least one of the plurality of structural supports is configured to reduce the compressing force delivered to the internal region, and wherein the enhancing element is configured to render the compressing force non-lethal, as delivered to the target animal.

13. The device of claim 8, wherein the sensory deprivation shield comprises a flexible transparent material, a rigid transparent material, a flexible translucent material, a rigid translucent material, or combinations thereof.

14. The device of claim 8, wherein the compressing plate further comprises an impact plate, the impact plate being configured to redistribute the compressing force substantially equally throughout the compressing plate.

15. A device for aerial ambush of an animal, comprising:
a supporting surface comprising a rigid material, the supporting surface having:
an outer surface; and
an inner surface positioned opposite the outer surface;
a sensory deprivation shield in connection with the inner surface of the supporting surface, the sensory deprivation shield defining an internal region between the sensory deprivation shield and the inner surface, the sensory deprivation shield comprising a flexible material, the sensory deprivation shield being configured to receive a compressing force and to distort the transmission of sound and light to the internal region; and
a plurality of structural supports supporting the sensory deprivation shield, the plurality of structural supports having a first end and a second end, the first end being in connection with the supporting surface, the plurality of structural supports interconnecting with and supporting the sensory deprivation shield as separated from the inner surface of the supporting surface, the plurality of structural supports maintaining an operational configuration of the sensory deprivation shield, the operational configuration of the sensory deprivation shield being the position and orientation of the sensory deprivation shield before hunter actuation through application of a compressing force, the structural supports being configured to control the transition of the sensory deprivation shield from the operational configuration to a debilitating configuration upon receiving the hunter-actuated compressing force.

16. The device of claim 15, wherein the plurality of structural supports and the sensory deprivation shield are configured to receive the compressing force upon hunter actuation by aerial ambush.

17. The device of claim 16, wherein the telescoping structural support further includes one or more enhancing elements, the enhancing elements modifying the amount or direction of the compressing force delivered to the internal region.

18. The device of claim 15, wherein the plurality of structural supports are connected at the first end and the second end.

19. The device of claim 15, wherein the sensory deprivation shield comprises one or more camouflage elements to help the sensory deprivation shield blend into the external environment.

20. The device of claim 15, wherein the sensory deprivation shield further comprises a flexible transparent material, a rigid transparent material, a flexible translucent material, a rigid translucent material, or combinations thereof.

* * * * *